United States Patent
Lee et al.

(10) Patent No.: US 10,294,852 B2
(45) Date of Patent: May 21, 2019

(54) ENGINE SYSTEM HAVING COOLANT CONTROL VALVE

(71) Applicant: HYUNDAI MOTOR COMPANY, Seoul (KR)

(72) Inventors: Yonggyu Lee, Suwon-si (KR); Seok Jun Yoon, Anyang-si (KR); Hyun Wook Ryu, Hwaseong-si (KR); Hogyoun Kang, Incheon (KR); Hyo Jo Lee, Suwon-si (KR); Sungmoon Cho, Hwaseong-si (KR); Jin Do Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 204 days.

(21) Appl. No.: 15/233,363

(22) Filed: Aug. 10, 2016

(65) Prior Publication Data

US 2017/0058753 A1 Mar. 2, 2017

(30) Foreign Application Priority Data

Aug. 25, 2015 (KR) .......................... 10-2015-0119559

(51) Int. Cl.

| *F01P 3/02* | (2006.01) |
|---|---|
| *F01P 7/14* | (2006.01) |
| *F01P 11/08* | (2006.01) |
| *F01P 11/16* | (2006.01) |
| *F01P 7/16* | (2006.01) |

(Continued)

(52) U.S. Cl.
CPC ................. *F01P 7/14* (2013.01); *F01P 7/165* (2013.01); *F01P 11/08* (2013.01); *F01P 11/16* (2013.01); *F16K 11/165* (2013.01); *F16K 31/52416* (2013.01); *F01P 2003/027* (2013.01); *F01P 2007/146* (2013.01); *F01P 2060/04* (2013.01);

(Continued)

(58) Field of Classification Search
CPC .... F01P 7/14; F01P 7/165; F01P 11/08; F01P 11/16; F01P 2003/027; F01P 2007/146; F01P 2060/04; F01P 2060/08; F01P 2060/18; F16K 11/165; F16K 31/52416
USPC ...................................................... 123/41.08
See application file for complete search history.

(56) References Cited

U.S. PATENT DOCUMENTS

| 2002/0069839 A1* | 6/2002 | Kunze | ....................... | F01P 3/02 |
| | | | | 123/41.1 |
| 2012/0204819 A1* | 8/2012 | DiPaola | ................. | F01P 7/165 |
| | | | | 123/41.08 |

(Continued)

FOREIGN PATENT DOCUMENTS

| KR | 10-2006-0072309 A | 6/2006 |
| KR | 10-2015-0080660 A | 7/2015 |

*Primary Examiner* — Joseph J Dallo
*Assistant Examiner* — Yi-Kai Wang
(74) *Attorney, Agent, or Firm* — Morgan Lewis & Bockius LLP (57) ABSTRACT

An engine system includes a cylinder block and a cylinder head. A coolant control valve unit is engaged with the cylinder head to receive a coolant exhausted from the cylinder block and a coolant exhausted from the cylinder head. The coolant control valve unit controls a coolant to be supplied to a heater, a radiator, and an oil cooler and controls the coolant exhausted from the cylinder block. The coolant control valve unit receives the coolant from the cylinder head, supplies the coolant to the oil cooler, and controls the coolant distributed to the heater and the coolant exhausted from the cylinder block.

15 Claims, 8 Drawing Sheets

(51) Int. Cl.
*F16K 31/524* (2006.01)
*F16K 11/16* (2006.01)

(52) U.S. Cl.
CPC ....... *F01P 2060/08* (2013.01); *F01P 2060/18* (2013.01)

(56) References Cited

U.S. PATENT DOCUMENTS

| | | | | |
|---|---|---|---|---|
| 2012/0312256 | A1* | 12/2012 | Komurian | F01P 7/167 123/41.44 |
| 2014/0209046 | A1* | 7/2014 | Steiner | F01P 5/10 123/41.31 |
| 2015/0121847 | A1* | 5/2015 | Pursifull | F01N 5/02 60/274 |
| 2018/0066758 | A1* | 3/2018 | Yumisashi | F01P 7/14 |

* cited by examiner

FIG. 1

-- PRIOR ART --

FIG. 2

— PRIOR ART —

ENGINE SYSTEM HAVING COOLANT CONTROL VALVE

CROSS-REFERENCE TO RELATED APPLICATION

This application claims the benefit of priority to Korean Patent Application No. 10-2015-0119559 filed in the Korean Intellectual Property Office on Aug. 25, 2015, the entire content of which is incorporated herein by reference.

TECHNICAL FIELD

The present disclosure relates to an engine system having a coolant control valve unit which improves a cooling efficiency and reduces fuel consumption by controlling a coolant distributed to a radiator, a heater, an oil cooler, and the like.

BACKGROUND

An engine generates a rotation force by combusting fuel, and the remaining energy from the combustion of the fuel is exhausted as heat energy. In particular, a coolant absorbs heat energy while circulating through the engine, a heater, and a radiator, and discharges the absorbed heat energy to outside.

When a coolant temperature of the engine is low, viscosity of the oil is increased. Thus, a frictional force is increased, fuel consumption is increased, and a temperature of an exhaust gas is slowly increased so that time for activation of a catalyst is extended, and accordingly, quality of the exhaust gas may be deteriorated. Furthermore, time for normalization of operation of the heater extends so that a passenger or a driver may feel cold.

When the coolant temperature of the engine is excessively high, knocking occurs, and ignition timing needs to be adjusted for suppression of the occurrence of knocking, thereby causing operation deterioration. In addition, when a temperature of lubricant is excessively high, lubrication performance may be deteriorated.

Thus, one integrated flow control valve that controls several cooling elements is applied to maintain a temperature of the coolant at a specific portion of the engine to be high and a temperature of the coolant at other portions to be low.

A block coolant inflow stopping technique for stopping a coolant flowing through a cylinder block has been being applied, and a research for precisely controlling a coolant supplied to the oil cooler has been being conducted.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine system having a coolant control valve unit having advantages of being capable of improving a cooling efficiency of a general coolant and precisely adjusting an oil temperature by stopping a coolant flowing through a cylinder block and precisely controlling a coolant supplied to an oil cooler.

According to an exemplary embodiment in the present disclosure, an engine system includes a cylinder block and a cylinder head. A coolant control valve unit is engaged with the cylinder head to receive a coolant exhausted from the cylinder block and a coolant exhausted from the cylinder head. The coolant control valve unit controls a coolant supplied to a heater, a radiator, and an oil cooler and the coolant exhausted from the cylinder block. The coolant control valve unit receives the coolant from the cylinder head, supplies the coolant to the oil cooler, and controls the coolant distributed to the heater and the coolant exhausted from the cylinder block.

The coolant control valve unit may include: a valve housing having a head coolant inflow path formed to include a coolant chamber formed therein and to receive the coolant from the cylinder head, a block coolant inflow path separately formed from the head coolant inflow path at a predetermined distance to receive the coolant from the cylinder block, an oil cooler supply path formed at an opposite side to the block coolant inflow path to face the block coolant inflow path, to supply the coolant to the oil cooler, and a heater supply path and a radiator supply path separately formed at an opposite side to the head coolant path at a predetermined distance, to respectively coolants to the heater and the radiator. A block coolant valve, a heater coolant valve, and a radiator coolant valve are disposed to respectively open or close the block coolant inflow path, the heater supply path, and the radiator supply path. The oil cooler may receive the coolant supplied from the coolant chamber. The coolant flowing to the coolant chamber through the head coolant inflow path is supplied to the oil cooler through the oil cooler supply path. When the block coolant valve is opened, a coolant supplied through the block coolant inflow path may be supplied to the oil cooler.

The engine system may further include an elastic member configured to elastically support the block coolant valve, the heater coolant valve, or the radiator coolant valve to close the valves.

The engine system may further include a driver configured to control opening rates of the block coolant valve, the heater coolant valve, or the radiator coolant valve depending on an operating condition and a temperature of the coolant.

The block coolant inflow path and the oil cooler supply path may be disposed to face each other, and a coolant flowing through the head coolant inflow path is transferred to the oil cooler supply path.

Some of a coolant flowing to the coolant chamber through the block coolant inflow path may be transferred to the oil cooler, and the rest of the coolant may be transferred to the heater supply path and the radiator supply path by flowing in an opposite direction to a direction from the block coolant inflow path to the oil cooler supply path.

A low-pressure exhaust gas recirculation (EGR) cooler may be disposed in series in a line of the coolant supplied to the heater to cool a low-pressure exhaust gas.

A high-temperature EGR valve may be disposed in parallel in a line of the coolant supplied to the oil cooler to cool a high-pressure exhaust gas.

The engine system may further include: an oil line supplying an oil from a first side of the cylinder block to the oil cooler, and circulating the oil from the oil cooler to a second side of the cylinder block; and a valve disposed to control the oil at one side of the oil line.

The driver may include: a rotational member configured to include a cam that is formed on a surface thereof to push the block coolant valve, the heater coolant valve, or the radiator coolant valve depending on a rotational position thereof; and a motor disposed to rotate the rotational member.

An amount of a coolant flowing through the block coolant inflow path may be larger than that of a coolant exhausted through the oil cooler supply path.

According to another exemplary embodiment in the present disclosure, a coolant control valve unit includes a valve housing having a first coolant inflow path formed to include a coolant chamber formed therein and to receive a coolant, a second coolant inflow path separately formed from the second coolant inflow path at a predetermined distance to receive a coolant, a first supply path and a second supply path separately formed at an opposite side to the first coolant path at a predetermined distance, to respectively supply the coolants to a first cooler and a second cooler, and a third coolant supply path formed at an opposite side to the second coolant inflow path to face the second coolant inflow path, to supply the coolant; and a first coolant valve, a second coolant valve, and a third coolant valve disposed to respectively open or close the first coolant inflow path, the second supply path, and the third supply path. When the third coolant valve is closed, a coolant flowing to the coolant chamber through the first coolant inflow path is supplied through the third coolant supply path. When the third coolant valve is opened, the third coolant supply path receives a coolant supplied from the second coolant inflow path The coolant control valve unit may further include an elastic member configured to elastically support the first, second, and third valves.

According to the exemplary embodiments in the present disclosure, it is possible to stop the coolant flowing through the cylinder block and circulate the coolant to the oil cooler, and it is possible to improve a warming-up performance in a low-temperature condition of the coolant and improve a function of the oil cooler in a high-temperature condition of the coolant by circulating the coolant flowing through the cylinder block to the oil cooler.

DETAILED DESCRIPTION OF THE EMBODIMENTS

An exemplary embodiment in the present disclosure will hereinafter be described in detail with reference to the accompanying drawings.

Figure 1:
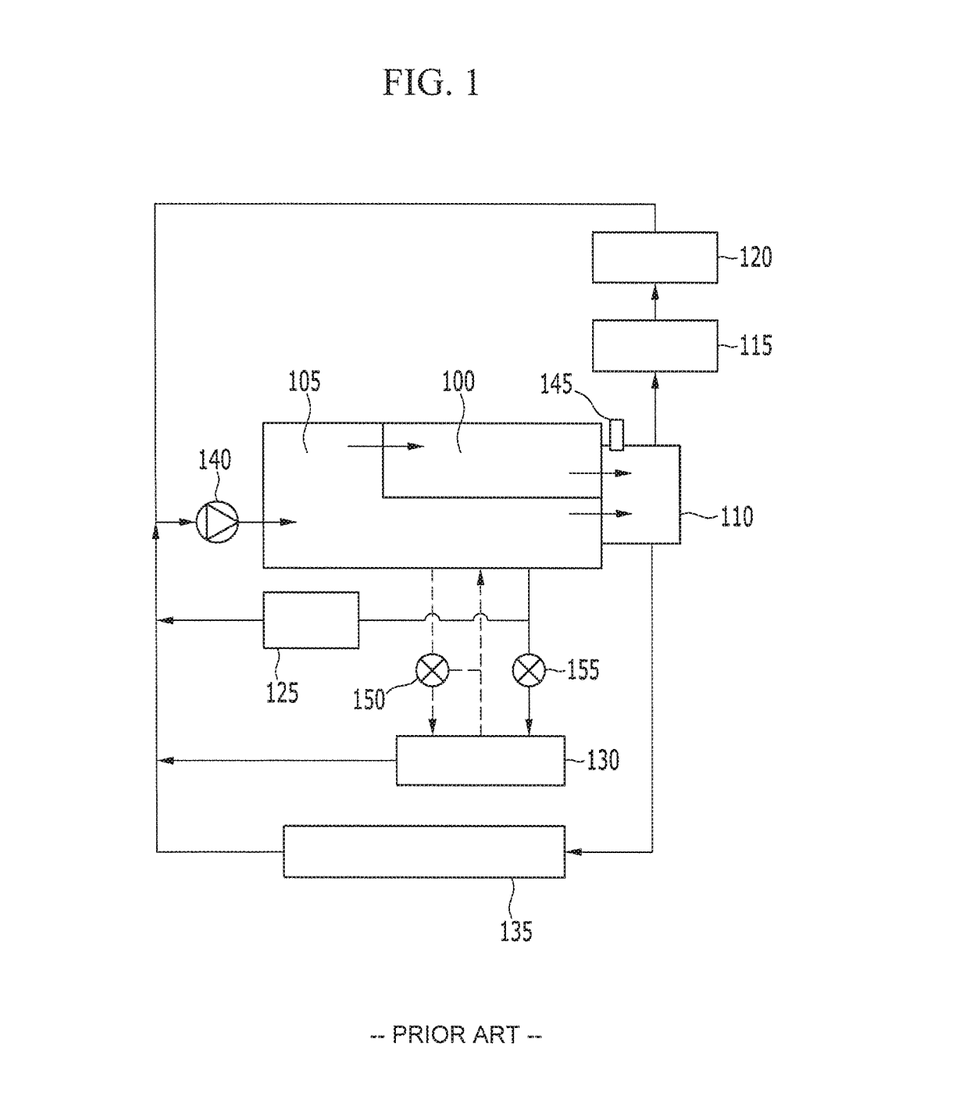
FIG. 1 is a schematic diagram illustrating a coolant flow in an engine system having a conventional coolant control valve unit.

FIG. 1 is a schematic diagram illustrating a general coolant flow in an engine system having a conventional coolant control valve unit.

Referring to FIG. 1, an engine system includes a cylinder head 100, a cylinder block 105, a coolant pump 140, a high-pressure exhaust gas recirculation (EGR) valve 125, a bypass valve 150, a thermostat 155, an oil cooler 130, a radiator 135, a coolant control valve unit 110, a temperature sensor 145, a low-pressure EGR cooler 115, and heater 120.

The cylinder head 100 is disposed on the cylinder block 105. A combustion chamber in which a piston is disposed is formed in the cylinder block 105, an exhaust port and an intake port, which communicate with the combustion chamber, are formed in the cylinder head 100.

The coolant control valve unit 110 distributes a coolant transferred from the cylinder head 100 and the cylinder block 105 to the low-pressure EGR cooler 115, the heater 120, and the radiator 135.

The coolant branches at one side of the cylinder block 105, and is distributed to the high-pressure EGR valve 125 and the oil cooler 130. A thermostat 155 controls the coolant distributed to the oil cooler 130. In addition, oil is circulated from the cylinder block 105 to the oil cooler 130, and the bypass valve 150 controls a flow of the oil.

Referring to FIG. 1, it is difficult to precisely control the coolant supplied to the oil cooler 130, it is also difficult to stop the coolant of the cylinder block 105, and an efficiency of the oil cooler 130 may be deteriorated.

Figure 2:
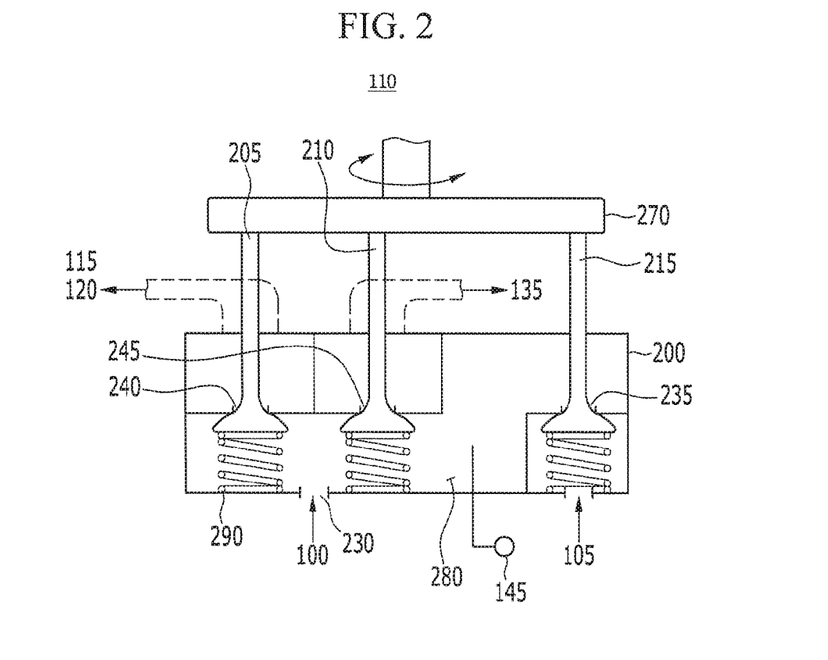
FIG. 2 is a schematic cross-sectional view partially illustrating a coolant conventional control valve unit.

FIG. 2 is a schematic cross-sectional view partially illustrating a conventional coolant control valve unit.

Referring to FIG. 2, the coolant control valve unit 110 includes a rotational member 270, a heater coolant valve 205, a radiator coolant valve 210, a block coolant valve 215, a valve housing 200, a block coolant inflow path 235, a temperature sensor 145, a coolant chamber 280, a head coolant inflow path 230, elastic members 290, a heater supply path 240, and a radiator supply path 245.

The head coolant inflow path 230 is formed at a first lower side of the valve housing 200 to receive a coolant from the cylinder head 100, and the block coolant inflow path 235 is formed at a second lower side of the valve housing 200 to receive a coolant from the cylinder block 105. A block coolant valve 215 is disposed in the block coolant inflow path 235 to control the inflow of the coolant.

The heater supply path 240 and the radiator supply path 245 are respectively formed at left and light sides to face the head coolant inflow path 230, the heater coolant valve 205 is disposed in the heater supply path 240, and the radiator coolant valve 210 is disposed in the radiator supply path 245.

The elastic members 290 elastically support the heater coolant valve 205, the radiator coolant valve 210, and the block coolant valve 215 to close the valves 205, 210, and 215, and a rotational member 270 is disposed to lift the valves 205, 210, and 215.

The rotational member 270 may be operated by a motor. In addition, the temperature sensor 145 is disposed to sense the temperature of a coolant filled in the coolant chamber 280.

A coolant flowing through the head coolant inflow path 230 and the block coolant inflow path 235 is filled in the coolant chamber 280, and is distributed to the heater 120 and the radiator 135 according to a valve position. The coolant supplied to the heater 120 is also circulated to the low-pressure EGR cooler 115.

Figure 3:
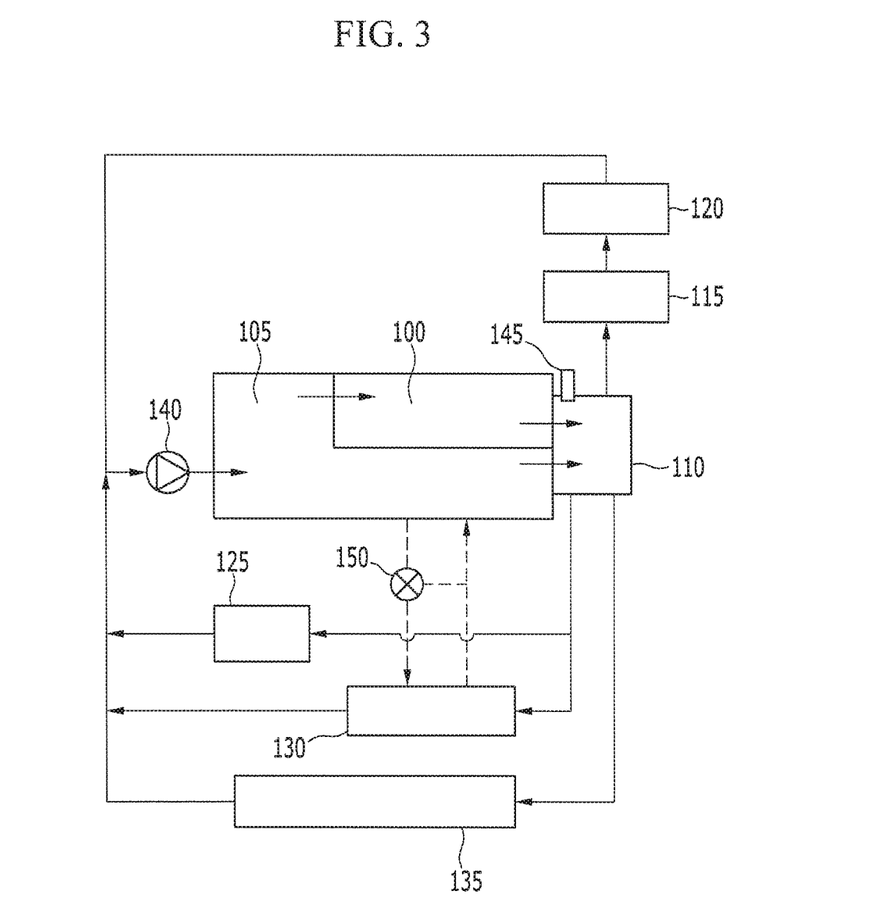
FIG. 3 is a schematic diagram illustrating a general coolant flow in an engine system having a conventional coolant control valve unit according to an exemplary embodiment in the present disclosure.

FIG. 3 is a schematic diagram illustrating a general coolant flow in an engine system having a conventional coolant control valve unit according to an exemplary embodiment in the present disclosure.

Referring to FIG. 3, the engine system includes a cylinder head 100, a cylinder block 105, a temperature sensor 145, a coolant control valve unit 110, a low-pressure EGR cooler 115, a heater 120, a radiator 135, an oil cooler 130, a high-pressure EGR valve 125, a coolant pump 140, and a bypass valve 150.

Structures and functions of the constituent elements refer to the known art, and portions related to the present disclosure will be selectively described.

A coolant pumped by the coolant pump 140 is distributed to the cylinder block 105 and the cylinder head 100 through one side of the cylinder block 105, and the coolant distributed to the cylinder block 105 and the coolant distributed to the cylinder head 100 are transferred to the coolant control valve unit 110.

The coolant control valve unit 110 distributes the coolant to the low-pressure EGR cooler 115, the oil cooler 130, and the radiator 135, and controls the coolant. The coolant is supplied to the high-pressure EGR valve 125 as well as the oil cooler 130, and the coolant supplied to the low-pressure EGR cooler 115 is re-supplied to the heater 120.

An oil circulating path is formed between the cylinder block 105 and the oil cooler 130, and a bypass valve 150 is disposed in a supply path through which oil is supplied from the cylinder block 105 to the oil cooler 130.

In the present disclosure, the coolant is circulated in the cylinder head 100, the coolant control valve unit 110, and the oil cooler 130 at all times, and the flow of the coolant distributed to the cylinder block 105 may stop.

When the coolant distributed to the cylinder block 105 is supplied to the coolant control valve unit 110, some of the coolant distributed to the cylinder block 105 is designed to be supplied to the oil cooler 130.

Figure 4:
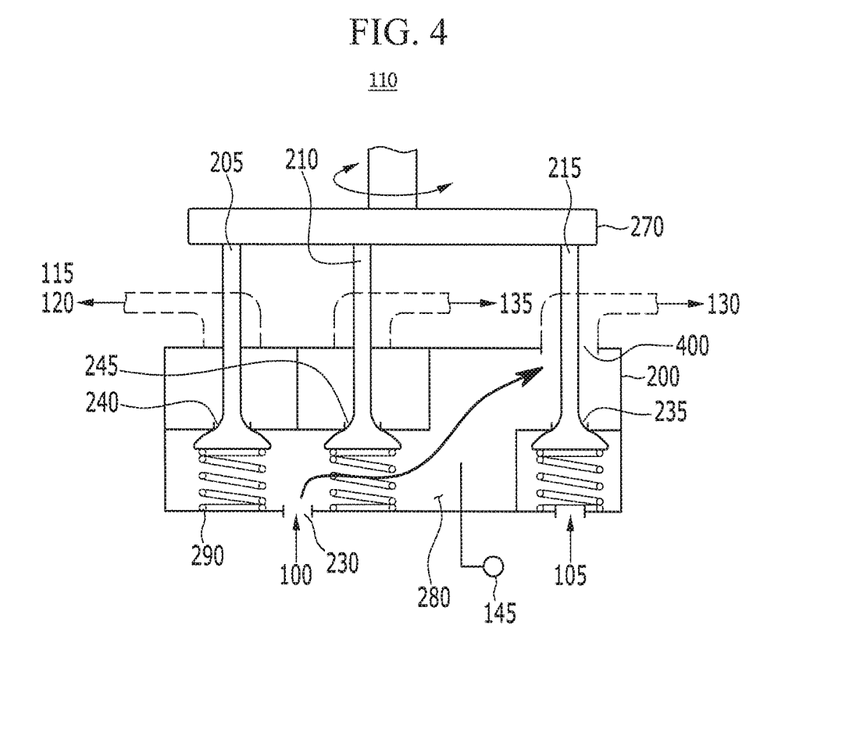
FIG. 4 is a schematic cross-sectional view illustrating a coolant control valve unit according to an exemplary embodiment in the present disclosure.

FIG. 4 is a schematic cross-sectional view illustrating a coolant control valve unit according to an exemplary embodiment in the present disclosure.

Referring to FIG. 4, the coolant control valve unit 110 includes a rotational member 270, a heater coolant valve 205, a radiator coolant valve 210, a block coolant valve 215, a valve housing 200, a block coolant inflow path 235, a temperature sensor 145, a coolant chamber 280, a head coolant inflow path 230, an elastic member 290, a heater supply path 240, a radiator supply path 245, and an oil cooler supply path 400.

The head coolant inflow path 230 through which a coolant is supplied from the cylinder head 100 is formed at a first lower side of the valve housing 200, and the block coolant inflow path 235 through which a coolant is supplied from the cylinder block 105 is formed at a second lower side of the valve housing 200. The block coolant valve 215 is disposed in the block coolant inflow path 235 to control to control the inflow of the coolant.

The heater supply path 240 and the radiator supply path 245 are respectively formed at left and light sides to face the head coolant inflow path 230, the heater coolant valve 205 is disposed in the heater supply path 240, and the radiator coolant valve 210 is disposed in the radiator supply path 245.

The oil cooler supply path 400 is formed at one side to face the block coolant inflow path 235, and the oil cooler supply path 400 is always opened without disposing an opening and closing valve. In addition, the head coolant inflow path 230 is always opened without disposing an opening and closing valve.

The elastic members 290 elastically support the heater coolant valve 205, the radiator coolant valve 210, and the block coolant valve 215 to close the valves 205, 210, and 215, and a rotational member 270 lifts the valves 205, 210, and 215.

The rotational member 270 may be operated by a motor. In addition, a temperature sensor 145 is disposed to sense the temperature of a coolant filled in the coolant chamber 280.

A coolant flowing through the head coolant inflow path 230 and the block coolant inflow path 235 is filled in the coolant chamber 280, and is distributed to the heater 120 and the radiator 135 according to a valve position. The coolant supplied to the heater 120 is also circulated to the low-pressure EGR cooler 115, and the coolant is supplied to the oil cooler 130 at all times.

In the present disclosure, the coolant flowing through the head coolant inflow path 230, in a state in which the block coolant inflow path 235, the heater supply path 240, and the radiator supply path 245 are closed, is circulated to the oil cooler 130.

Accordingly, the cylinder block 105 may be quickly warmed up at a low temperature of the coolant, and the oil may be quickly heated by the oil cooler 130.

Figure 5:
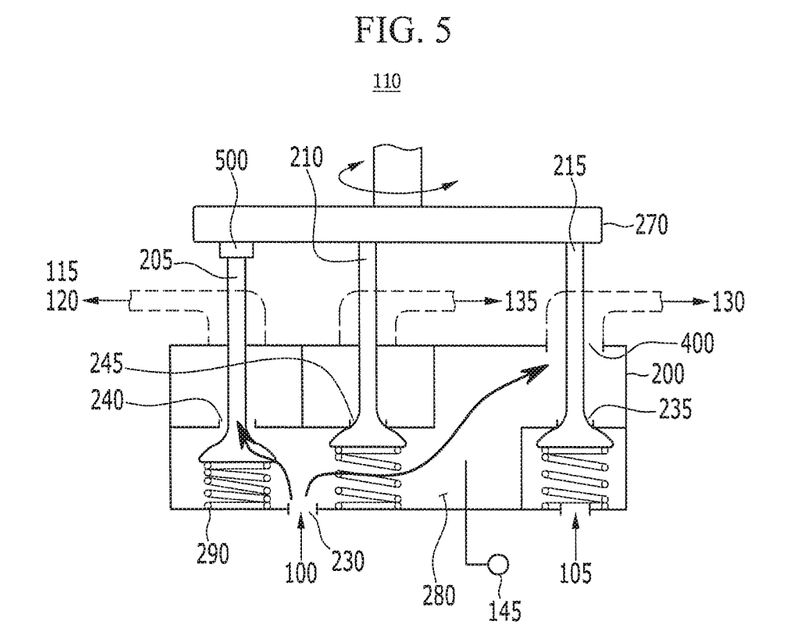
FIG. 5 is a schematic cross-sectional view illustrating a state in which a heater coolant valve is opened in a coolant control valve unit according to an exemplary embodiment in the present disclosure.

FIG. 5 is a schematic cross-sectional view illustrating a state in which a heater coolant valve is opened in a coolant control valve unit according to an exemplary embodiment in the present disclosure.

Referring to FIG. 5, the rotational member 270 rotates in the condition of FIG. 4 so that a cam 500 downwardly moves to push the heater coolant valve 205, thereby opening the heater supply path 240.

Accordingly, the coolant supplied to the coolant chamber 280 through the head coolant inflow path 230 is distributed to the heater supply path 240 and the oil cooler supply path 400.

Figure 6:
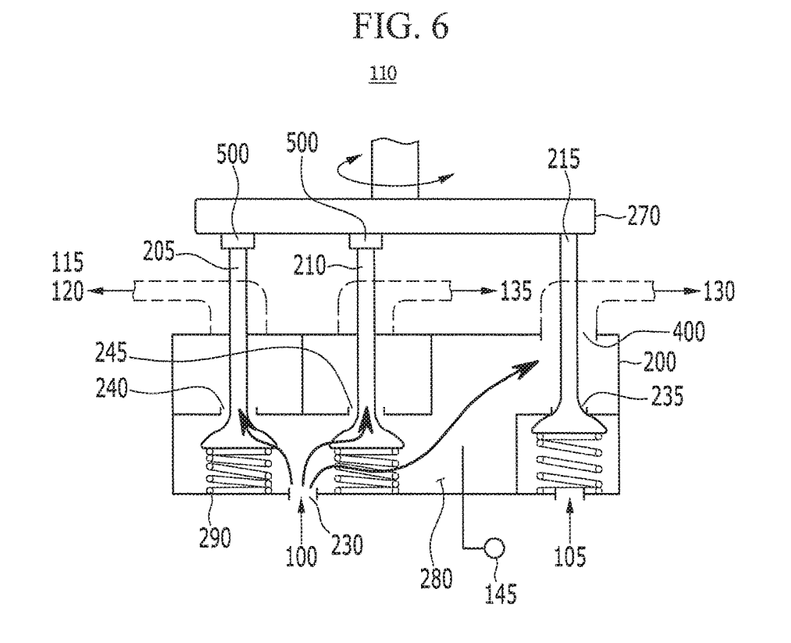
FIG. 6 is a schematic cross-sectional view illustrating a state in a state in which a heater coolant valve and a radiator coolant valve are opened in a coolant control valve unit according to an exemplary embodiment in the present disclosure.

FIG. 6 is a schematic cross-sectional view illustrating a state in a state in which a heater coolant valve and a radiator coolant valve are opened in a coolant control valve unit according to an exemplary embodiment in the present disclosure.

Referring to FIG. 6, the rotational member 270 is rotated in the condition of FIG. 4 so that a cam 500 is downwardly moved to push the heater coolant valve 205 and the radiator coolant valve 210, thereby opening the heater supply path 240 and the radiator supply path 245, respectively.

Accordingly, the coolant supplied to the coolant chamber 280 through the head coolant inflow path 230 is distributed to the heater supply path 240, the radiator supply path 245, and the oil cooler supply path 400.

Figure 7:
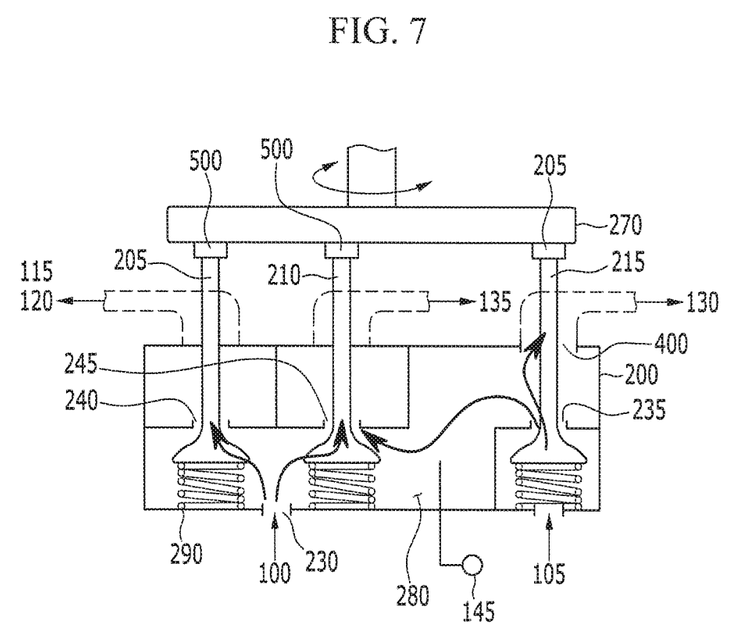
FIG. 7 is a schematic cross-sectional view illustrating a state in which a heater coolant valve, a radiator coolant valve, and a block coolant valve are opened in a coolant control valve unit according to an exemplary embodiment in the present disclosure.

FIG. 7 is a schematic cross-sectional view illustrating a state in which a heater coolant valve, a radiator coolant valve, and a block coolant valve are opened in a coolant control valve unit according to an exemplary embodiment in the present disclosure.

Referring to FIG. 7, the rotational member 270 is rotated in the condition of FIG. 4 so that a cam 500 is downwardly moved to push the heater coolant valve 205, the radiator coolant valve 210, and the block coolant valve 215, thereby opening the heater supply path 240, the radiator supply path 245, and the block coolant inflow path 235, respectively.

Accordingly, the coolant is supplied to the coolant chamber 280 through the head coolant inflow path 230 and the block coolant inflow path 235, and is distributed to the heater supply path 240, the radiator supply path 245, and the oil cooler supply path 400.

Herein, some of the coolant flowing through the block coolant inflow path 235 is transferred to the oil cooler supply path 400, and the other of the coolant is distributed to the heater supply path 240 or the radiator supply path 245. As a result, an amount of the coolant flowing through the block coolant inflow path 235 is larger than that of the coolant supplied to the oil cooler 130 through the oil cooler supply path 400.

Accordingly, it is possible to expect an effect that the coolant flowing through the cylinder block 105 is circulated to the oil cooler 130, thereby improving cooling performance of the oil cooler 130.

Figure 8:
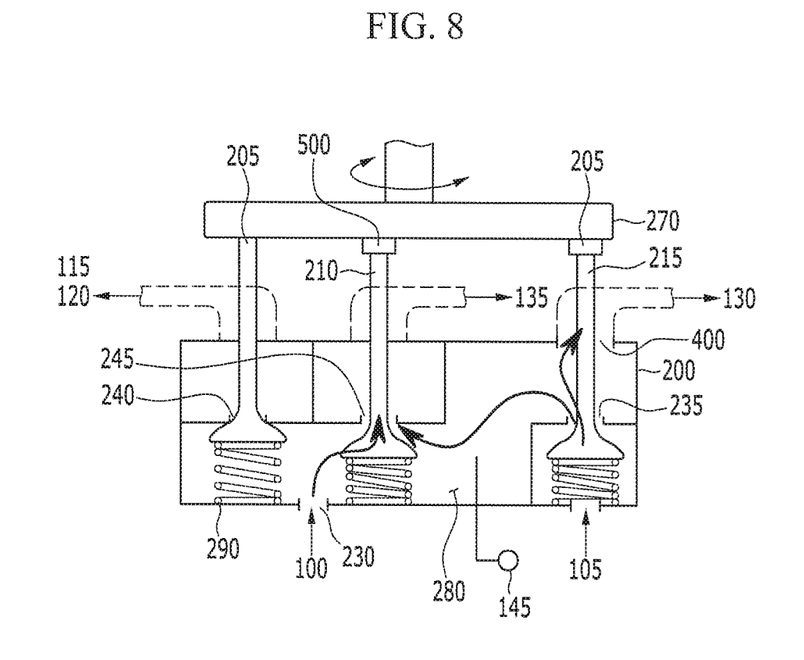
FIG. 8 is a schematic cross-sectional view illustrating a state in which a radiator coolant valve and a block coolant valve according to an exemplary embodiment in the present disclosure.

FIG. 8 is a schematic cross-sectional view illustrating a state in which a radiator coolant valve and a block coolant valve according to an exemplary embodiment in the present disclosure.

Referring to FIG. 8, the rotational member 270 is rotated in the condition of FIG. 4 so that a cam 500 is downwardly moved to the radiator coolant valve 210 and the block coolant valve 215, thereby opening the radiator supply path 245 and the block coolant inflow path 235, respectively.

Accordingly, the coolant is supplied to the coolant chamber 280 through the head coolant inflow path 230 and the block coolant inflow path 235, and is distributed to the radiator supply path 245 and the oil cooler supply path 400

Herein, some of the coolant flowing through the block coolant inflow path 235 is transferred to the oil cooler supply path 400, and the other of the coolant is distributed to the radiator supply path 245.

As a result, the amount of the coolant flowing through the block coolant inflow path 235 is larger than that of the coolant supplied to the oil cooler 130 through the oil cooler supply path 400.

Accordingly, it is possible to expect an effect that the coolant flowing through the cylinder block 105 is circulated to the oil cooler 130, thereby improving cooling performance of the oil cooler 130.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine system comprising:
   a cylinder block;
   a cylinder head; and
   a coolant control valve engaged with the cylinder head to receive a coolant exhausted from the cylinder block and a coolant exhausted from the cylinder head, the coolant control valve controlling the coolant to be supplied to a heater, a radiator, and an oil cooler and controlling the coolant exhausted from the cylinder block,
   wherein the coolant control valve includes a valve housing,
   wherein the coolant control valve continuously receives therein the coolant from the cylinder head, continuously supplies the coolant to the oil cooler through the valve housing, selectively supplies the coolant to the heater and the radiator, and selectively receives the coolant exhausted from the cylinder block.

2. The engine system of claim 1,
   wherein the valve housing includes: a head coolant inflow path formed to include a coolant chamber formed therein and to receive a coolant from the cylinder head; a block coolant inflow path separately formed from the head coolant inflow path at a predetermined distance to receive the coolant from the cylinder block; an oil cooler supply path formed at an opposite side to the block coolant inflow path to face the block coolant inflow path and to supply the coolant to the oil cooler; and a heater supply path and a radiator supply path separately formed at an opposite side to the head coolant path at a predetermined distance, to respectively supply the coolant to the heater and the radiator,
   wherein the coolant control valve further includes: a block coolant valve, a heater coolant valve, and a radiator coolant valve disposed to open or close the block coolant inflow path, the heater supply path, and the radiator supply path, respectively,
   wherein the oil cooler receives the coolant supplied from the coolant chamber,
   wherein the coolant flowing to the coolant chamber through the head coolant inflow path is supplied to the oil cooler through the oil cooler supply path, and
   wherein when the block coolant valve is opened, the coolant supplied through the block coolant inflow path is supplied to the oil cooler.

3. The engine system of claim 2, further comprising:
   an elastic member elastically supporting the block coolant valve to close the block coolant valve.

4. The engine system of claim 2, further comprising:
   a driver configured to control opening rates of the block coolant valve, the heater coolant valve, and the radiator coolant valve, respectively, depending on an operating condition and a coolant temperature.

5. The engine system of claim 2, wherein the block coolant inflow path and the oil cooler supply path face each other, and a coolant flowing through the head coolant inflow path is transferred to the oil cooler supply path.

6. The engine system of claim 5, wherein some of the coolant flowing to the coolant chamber through the block coolant inflow path is transferred to the oil cooler, and the rest of the coolant is transferred to the heater supply path and the radiator supply path by flowing in an opposite direction to a direction from the block coolant inflow path to the oil cooler supply path.

7. The engine system of claim 6, wherein the amount of the coolant flowing through the block coolant inflow path is larger than that of the coolant exhausted through the oil cooler supply path.

8. The engine system of claim 6, wherein, when the block coolant valve is closed, the coolant flowing through the head coolant inflow path is supplied to the oil cooler through the oil cooler supply path, and
   when the block coolant valve is opened, the coolant flowing through the block coolant inflow path is supplied to the oil cooler through the oil cooler supply path.

9. The engine system of claim 1, wherein a low-pressure exhaust gas recirculation (EGR) cooler is disposed in series in a line of the coolant supplied to the heater to cool a low-pressure exhaust gas.

10. The engine system of claim 1, wherein a high-temperature EGR valve is disposed in parallel in a line of the coolant supplied to the oil cooler to cool a high-pressure exhaust gas.

11. The engine system of claim 1, further comprising:
an oil line supplying an oil from a first side of the cylinder block to the oil cooler and circulating the oil from the oil cooler to a second side of the cylinder block; and
a valve disposed to control the oil at one side of the oil line.

12. The engine system of claim 4, wherein the driver includes:
a rotational member including a cam that is formed on a surface of the rotational member to push the block coolant valve, the heater coolant valve, or the radiator coolant valve depending on a rotational position thereof; and
a motor rotating the rotational member.

13. The engine system of claim 12, further comprising a temperature sensor configured to sense an internal temperature of the coolant chamber.

14. The engine system of claim 2, further comprising:
an elastic member elastically supporting the heater coolant valve to close the heater coolant valve.

15. The engine system of claim 2, further comprising:
an elastic member elastically supporting the radiator coolant valve to close the radiant coolant valve.

\* \* \* \* \*